Nov. 1, 1938.      F. V. CLANCY      2,134,777
SOLENOID
Filed Aug. 25, 1936
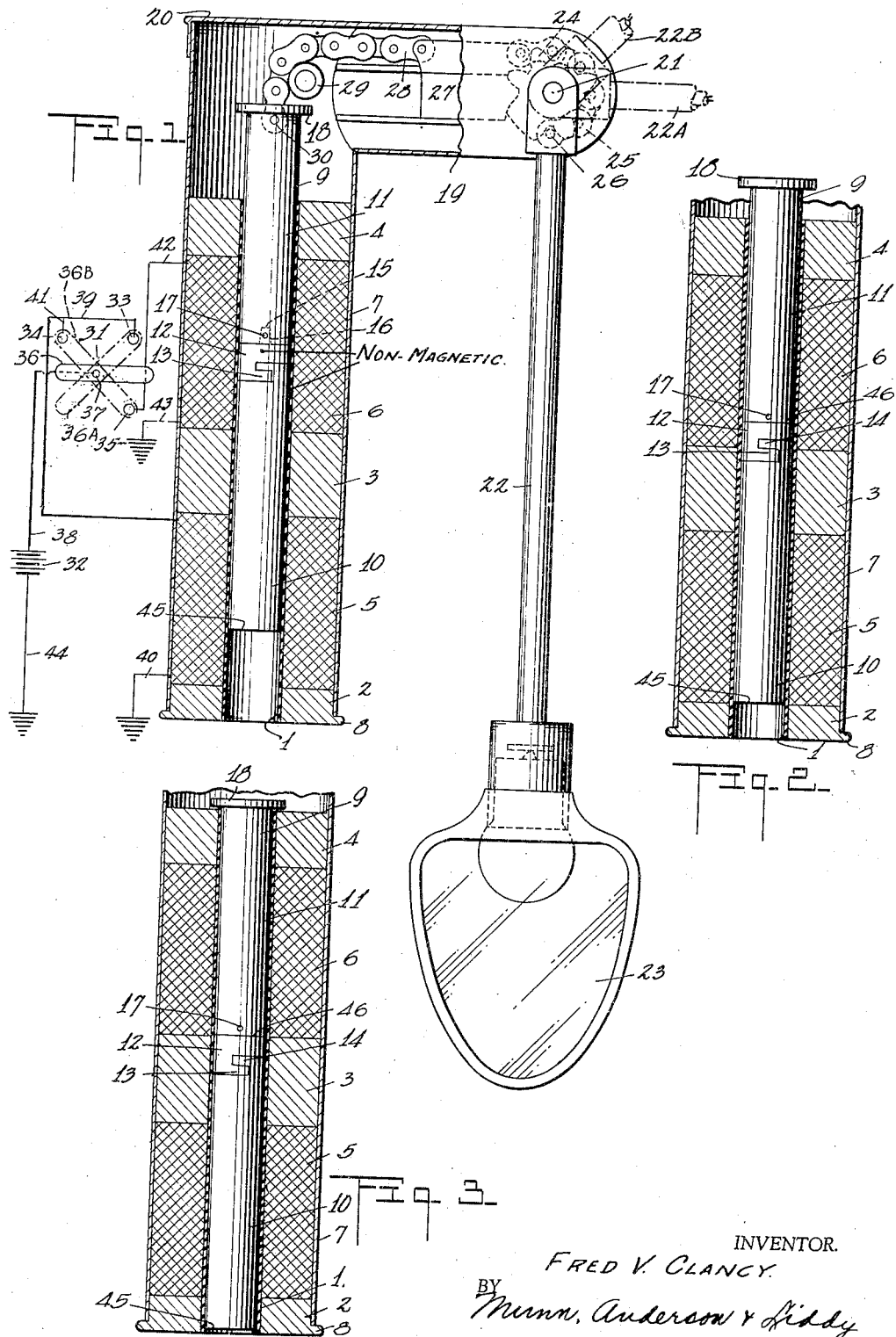
INVENTOR.
FRED V. CLANCY.
BY Munn, Anderson & Liddy
ATTORNEYS.

Patented Nov. 1, 1938

2,134,777

UNITED STATES PATENT OFFICE 2,134,777

SOLENOID

Fred V. Clancy, Los Altos, Calif.

Application August 25, 1936, Serial No. 97,775

2 Claims. (Cl. 175—337)

My invention relates to improvements in solenoids, and it consists of the combinations, constructions and arrangements hereinafter described and claimed.

An object of my invention is to provide a solenoid in which novel means is provided for moving the plunger into either one of two or more positions. The solenoid may be used for any purpose desired, and I have illustrated one such use in the provision of a semaphore that may be swung into two different positions.

The device is extremely simple in construction, and two or more permanent stops are provided for the plunger, these stops being controlled by the energizing of field coils.

Other objects and advantages will appear in the following specification, and the novel features of the device will be particularly pointed out in the appended claims.

My invention is illustrated in the accompanying drawing forming a part of this application, in which Figure 1 is a sectional view through the solenoid showing it operatively connected to a semaphore;

Figure 2 is a section through the solenoid showing the plunger in one of its two positions; and Figure 3 is a view similar to Figures 1 and 2 but the plunger is shown in its second position.

In carrying out my invention I provide a central non-magnetic tube 1. A soft iron washer 2 is mounted at the lower end of the tube 1. A second soft iron washer 3 is secured to the tube 1, and is spaced from the washer 2. At the top of the tube I dispose a third soft iron washer indicated generally at 4 and this is spaced from the washer 3. The spaces between the washers 2 and 3, and 3 and 4 are filled with field coils 5 and 6 respectively. A casing 7 encloses the soft iron washers and field coils and the bottom of the casing rests on a flange 8 formed in the washer 2.

Within the tube 1 I mount a plunger indicated generally at 9. This plunger has a soft iron lower portion 10 separated from a soft iron upper portion 11 by a non-magnetic washer 12. The washer 12 may be secured to the portions 10 and 11 in any manner desired. In Figure 1 I show the washer provided with a hook-shaped portion 13 designed to engage with a hook-shaped portion 14 formed in the top of the portion 10. The washer also has a projection 15 that enters a recess 16 in the under side of the upper portion 11. The projection 15 may be secured to the portion 11 by any means such as a pin 17. The top of the upper portion 11 is provided with a head 18 that acts as a stop for limiting the downward movement of the plunger.

Although the semaphore shown in Figure 1 forms no part of my invention I have illustrated it in the drawing in order to show one of the many uses for the solenoid. The casing 7 has a hollow arm 19 projecting therefrom, and this arm has a portion 20 acting as a cover for the top of the casing. A shaft 21 is carried by the free end of the hollow arm and a semaphore arm 22 is secured to the shaft. The arm 22 carries an indicating member 23 at its outer end. A sprocket 24 is mounted on the shaft 21 and is housed within the hollow arm 19. A chain 25 is secured to the sprocket at 26, and has its other end connected to a sliding shoe 27. A second chain 28 is connected to the shoe 27, and has its other end passed over an idler 29 and connected to the top of the plunger 9 as at 30. When the plunger is moved downwardly in the manner now to be described, the semaphore arm 22 is swung into either of its two positions indicated at 22A and 22B.

From the foregoing description of the various parts of the device, the operation thereof may be readily understood.

The two-way switch indicated generally at 31 is shown in Figure 1, and electrically connects a source of current such as a battery 32 with one or both of the field coils 5 and 6. The switch 31 has three terminals 33, 34 and 35 respectively. A switch arm 36 is pivoted at 37 and is in electrical connection with the battery by means of a wire 38. A wire 39 leads from the terminal 33 to the field coil 5. The other end of the field coil is grounded as shown at 40. Another wire 41 connects the terminal 34 with the wire 39. A terminal 35 is connected to the field coil 6 by means of a wire 42. The other end of this field coil is grounded as at 43. The battery 32 is grounded as at 44 and thus the various circuits may be completed when the switch arm 36 is swung into its different positions. When the solenoid is in the position shown in Figure 1, the switch arm 36 is disposed between the terminals so that no circuit will be closed to the field coils.

When it is desired to swing the semaphore arm 22 into the position 22A, the switch arm 36 is swung into the dotted line position 36A shown in Figure 1. This will energize the field coil 5 and will make the soft iron washers 2 and 3 of opposite polarity. The field coil 5 will attract the lower soft iron portion 10 into the position shown in Figure 2. This will move the plunger 9 downwardly and act upon the chains for rotating the sprocket and swinging the arm 22 into the position 22A. The lower portion 10 of the plunger will be held in the position shown in Figure 2 because the portion 10 will act as a conductor for the flux flowing in the magnetic field set up by the energized coil 5. The bottom 45 of the portion 10 will lie flush with the bottom of the coil 5, and the flux will hold the portion 10 in this position and prevent it from moving upwardly so long as the field coil 5 is energized. In this way the field coil 5 acts to insure that the arm 22 will always be swung into substantially the same position 22A each time the field coil 5 is energized.

It is well known in the theory of solenoids that when a coil is energized such as the coil 5, a soft iron portion such as the portion 10 may be moved readily through the center of the coil until either end of the portion 10 reaches the corresponding end of the coil 5. Further movement of the portion 10 into the coil is prevented by the force of the flux moving through the magnetic path afforded by the soft iron portion 10. It is for this reason that the weight of the semaphore arm 22 will not move the plunger 9 above a point where the bottom 45 lies flush with the bottom of the coil 5 so long as the coil is energized.

It will be noted that so long as the field coil 5 is energized the soft iron portion 11 has no effect, and merely acts as a connector between the portion 10 and the chain 28. When now the switch arm 36 is swung into the dotted line position 36B shown in Figure 1 the field coils 5 and 6 will be connected in parallel relation with the source of current, and both field coils will be energized. The plunger 9 will then move into the position shown in Figure 3. This will swing the arm 22 into the position shown at 22B. In Figure 3 I show the lower end 46 of the portion 11 lying flush with the bottom of the field coil 6. When both the field coils 5 and 6 are energized the washer 3 becomes neutral and the washers 2 and 4 are provided with opposite polarities. The coil 5 will not act upon the portion 10 to prevent the bottom 46 of the portion 11 from being brought into a position flush with the under side of the coil 6. Figure 3 clearly shows that neither end of the portion 10 lies between the ends of the bore of the coil 5. The magnetic flux created by the coil 5 will therefore have no tendency to act upon the portion 10 to offset the movement of the portion 11. The weight of the arm 22 will act upon the plunger 9 to raise the portion 11, but this portion will be held against movement above a position where the bottom 46 lies flush with the bottom of the coil 6. The stop 18 is provided for limiting the downward movement of the plunger 9, and this prevents the arm 22 from being swung beyond its extreme position shown at 22B. The non-magnetic washer 12 is long enough to prevent the magnetic flux from flowing from the portion 10 to the portion 11.

It is obvious that additional coils and soft iron portions may be added to the solenoid to increase the number of positions into which the plunger 9 may be moved, and I have shown two positions for illustrative purposes.

While I have shown only the preferred form of my invention, it should be understood that various changes or modifications may be made within the scope of the appended claims without departing from the spirit of the invention.

I claim:

1. A solenoid comprising a coil, a plunger section movably mounted in the coil and having one end operatively connected to a load, means for energizing the coil for moving the plunger section so that its free end will lie flush with an end of the coil, the other end of the section projecting beyond the opposite end of the coil, a second coil spaced from the last-named end of the first coil, a second plunger section slidably mounted in the second coil, non-magnetic means connecting the two plunger sections together, said second plunger section being interposed between the load and the first plunger section, the end of the second plunger section nearest the first plunger section being disposed between the ends of the second coil when the first section has been moved by the energizing of the first coil, said coil energizing means including means for energizing both coils, whereby the end of the second section disposed nearest the first section will be moved flush with the end of the second coil disposed nearest the first coil, and the end of the first section disposed nearest the second section will not be moved beyond the adjacent end of the first coil.

2. A solenoid comprising a coil, a plunger section movably mounted in the coil and having one end operatively connected to a load, means for energizing the coil for moving the plunger section so that its free end will lie flush with an end of the coil, the other end of the section projecting beyond the opposite end of the coil, a second coil spaced from the last-named end of the first coil, a second plunger section slidably mounted in the second coil, non-magnetic means connecting the two plunger sections together, said second plunger section being interposed between the load and the first plunger section, the end of the second plunger section nearest the first plunger section being disposed between the ends of the second coil when the first section has been moved by the energizing of the first coil, said coil energizing means including means for energizing both coils, whereby the end of the second section disposed nearest the first section will be moved flush with the end of the second coil disposed nearest the first coil, and the end of the first section disposed nearest the second section will not be moved beyond the adjacent end of the first coil, and a magnetizable washer disposed between the two coils.

FRED V. CLANCY.